(12) United States Patent
Liang

(10) Patent No.: US 6,459,233 B1
(45) Date of Patent: Oct. 1, 2002

(54) CABLE ATTACHMENT ASSEMBLY FOR BATTERY OF VEHICLE

(76) Inventor: Shih Tsung Liang, P.O. Box 10-69, Chong Ho, Taipei (TW), 235

( * ) Notice: Subject to any disclaimer, the term of this patent is extended or adjusted under 35 U.S.C. 154(b) by 0 days.

(21) Appl. No.: 09/840,508

(22) Filed: Apr. 20, 2001

(51) Int. Cl.[7] .............................................. H01M 10/46
(52) U.S. Cl. ..................................... 320/105; 439/754
(58) Field of Search ................................. 320/103, 104, 320/105, 107, 111; 439/753, 754, 757, 761, 773

(56) References Cited

U.S. PATENT DOCUMENTS

| | | |
|---|---|---|
| 4,555,159 A | * 11/1985 | Chartrain et al. |
| 4,885,524 A | 12/1989 | Wilburn |
| 5,214,368 A | 5/1993 | Wells |
| 5,254,020 A | * 10/1993 | Obligar |
| 5,367,243 A | 11/1994 | Wells et al. |
| 5,612,659 A | * 3/1997 | Kerber |

\* cited by examiner

Primary Examiner—Edward H. Tso

(57) ABSTRACT

A cable attachment device includes a clamping member for engaging onto the terminal post of the battery and having two ears extended from the ends. A fastener may engaged through the ears for forcing and securing the ears together and for securing the clamping member onto the terminal post of the battery. The clamping member includes one or more flaps or one or more clamping barrels or one or more tubes for electrically coupling to an electric cable. The cables may couple the other electric facilities to the battery with the flaps or the clamping barrels or the tubes.

11 Claims, 5 Drawing Sheets

CABLE ATTACHMENT ASSEMBLY FOR BATTERY OF VEHICLE

BACKGROUND OF THE INVENTION

1. Field of the Invention

The present invention relates to a cable attachment, and more particularly to a cable attachment assembly for attaching onto the battery of the vehicle.

2. Description of the Prior Art

Typical cable attachments for attaching onto the batteries of the vehicles comprise one or more rings and/or barrels and/or cylindrical members secured to the ends of the cables for engaging onto and for securing to the positive and the negative terminal posts of the batteries of the vehicles. U.S. Pat. No. 5,214,368 to Wells, and U.S. Pat. No. 5,367,243 to Wells et al., disclose two of the typical cable attachments for attaching onto the batteries of the vehicles. U.S. Pat. No. 4,885,524 to Wilburn discloses the other typical cable attachment for attaching onto the batteries of the vehicles and comprises one or more specially designed and shaped cable plugs for plugging or attaching onto the positive and the negative terminal posts of the batteries of the vehicles. However, the typical cable attachments may not be used for coupling to the other electric facilities.

The present invention has arisen to mitigate and/or obviate the afore-described disadvantages of the conventional cable attachments.

SUMMARY OF THE INVENTION

The primary objective of the present invention is to provide a cable attachment for attaching onto the battery of the vehicle and for coupling to the other electric facilities.

In accordance with one aspect of the invention, there is provided a cable attachment assembly for attaching onto a terminal post of a battery of a vehicle, the cable attachment assembly comprising a clamping member including an opening formed therein for receiving the terminal post of the battery and including two ends each having an ear extended therefrom, the ears each including an orifice formed therein, and a fastener engaged through the orifices of the ears for forcing and securing the ears together and for easily and solidly securing the clamping member onto the terminal post of the battery.

The clamping member includes at least one flap extended therefrom for electrically coupling to a cable. A cable includes a first end having a coupler attached thereto, and means for securing the first end of the cable to the flap.

The coupler includes a hole formed therein, the flap includes a screw hole formed therein, and the securing means includes a fastener engaged through the hole of the coupler and threaded to the screw hole of the flap.

The clamping member includes at least one clamping barrel extended therefrom for electrically coupling to a cable. The clamping barrel includes two edges and a slot formed between the edges thereof, for allowing the clamping barrel to be clamped onto the cable.

The clamping member includes at least one tube extended therefrom for electrically coupling to a cable, and means for securing the cable to the tube.

The securing means includes an inner thread formed in the tube, a lock nut threaded to the inner thread of the tube and having a bore formed therein for receiving the cable. A block is further provided and engaged in the tube for engaging with the cable. The electric wires of the cable may be bent and secured between the block and the lock nut. The electric cables may thus easily couple the other electric facilities to the battery of the vehicle with the flaps or the clamping barrels or the tubes of the clamping member.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
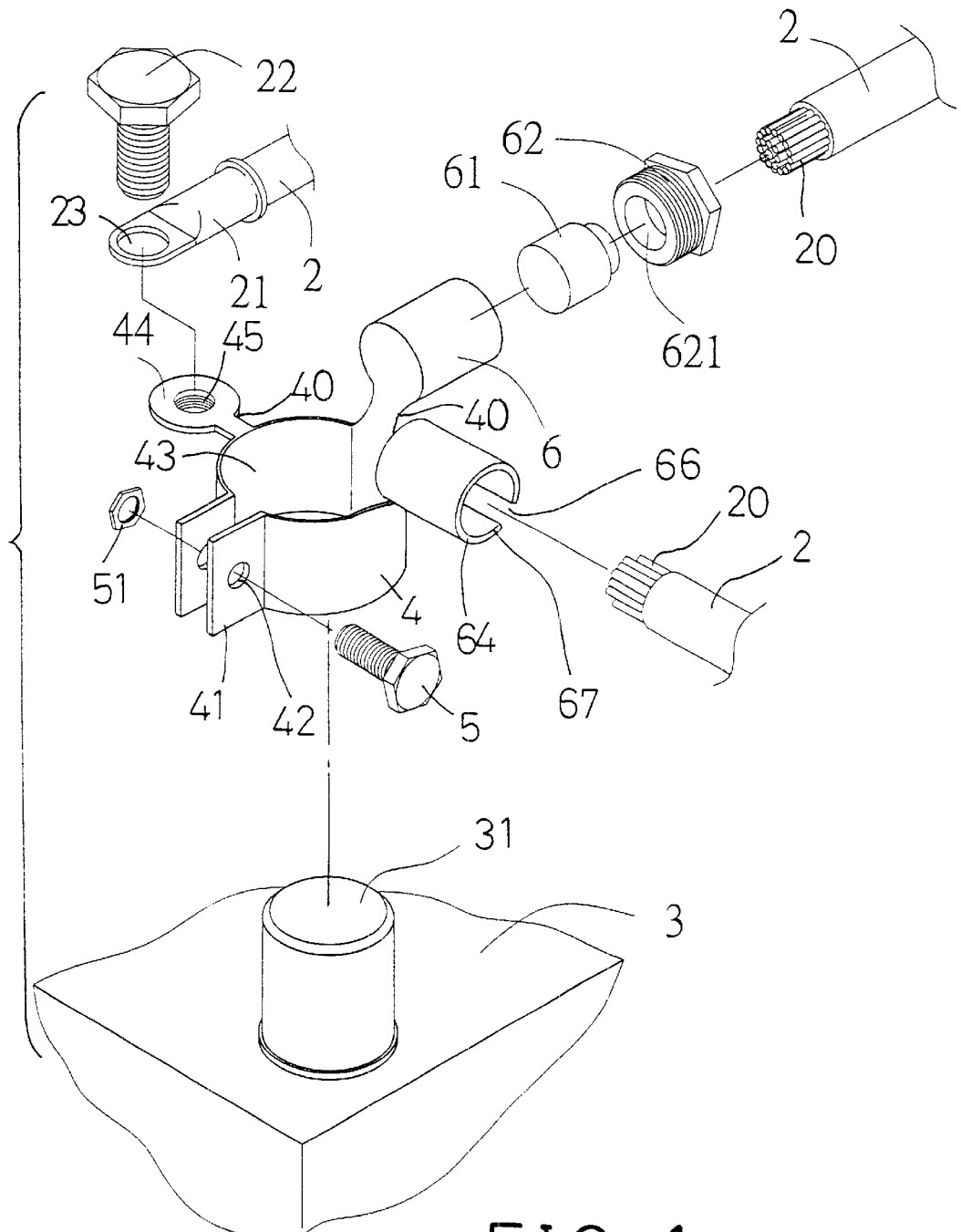
FIG. 1 is an exploded view of a cable attachment assembly in accordance with the present invention.
Figure 2:
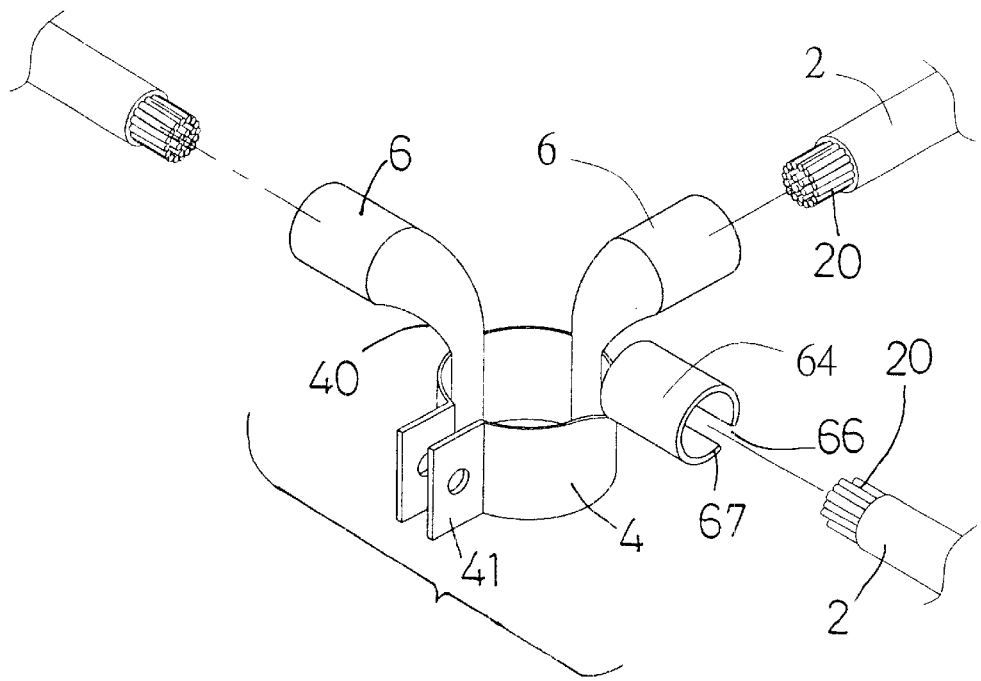
FIGS. 2, 3, 4, 5 are partial exploded views illustrating the other embodiments of the cable attachment assembly.

Referring to the drawings, and initially to FIG. 1, a cable attachment assembly in accordance with the present invention comprises a clamping member 4, such as an open ring 4 including an opening 43 formed therein for receiving the positive or the negative conductive terminal post 31 of the batteries 3 of the vehicles. The clamping member 4 includes two ends each having an ear 41 extended therefrom and each having an orifice 42 formed in the ear 41 for receiving a fastener 5 or the like. The fastener 5 may thus engaged through the orifices 42 of the ears 41 and engaged with a lock nut 51 for forcing the ears 41 toward each other and for securing the clamping member 4 onto the positive or the negative terminal post 31 of the batteries 3 of the vehicles.

The clamping member 4 includes one or more extensions 40 (FIGS. 1–7) laterally or radially extended outward from the upper portion thereof, and includes one or more flaps 44 (FIGS. 1, and 6–8) laterally or radially extended outward from the upper portion thereof or extended outward from the extensions 40 respectively. The flaps 44 each includes a screw hole 45 formed therein for threading with a fastener 22. The cable 2 may include a coupler 21 attached to the end thereof and having a hole 23 formed therein for receiving the fastener 22 which may easily secure and electrically couple the coupler 21 of the cable 2 to the positive or the negative terminal post 31 of the batteries 3 of the vehicles via the flaps 44 of the clamping member 4.

The clamping member 4 further includes one or more cylindrical tubes 6 (FIGS. 1–3 and 5), and/or one or more clamping barrels 64, 8 (FIGS. 1–4) laterally or radially extended outward from the upper-portion thereof, or extended outward from the extensions 40 respectively. The clamping barrels 64, 8 each includes a slot 66, 81 formed between two edges 67, 82 for clamping onto the ends of the cables 2 and for electrically coupling or securing the cables 2 to the positive or the negative terminal post 31 of the batteries 3 of the vehicles via the clamping barrels 64, 8 of the clamping member 4.

Figure 3:
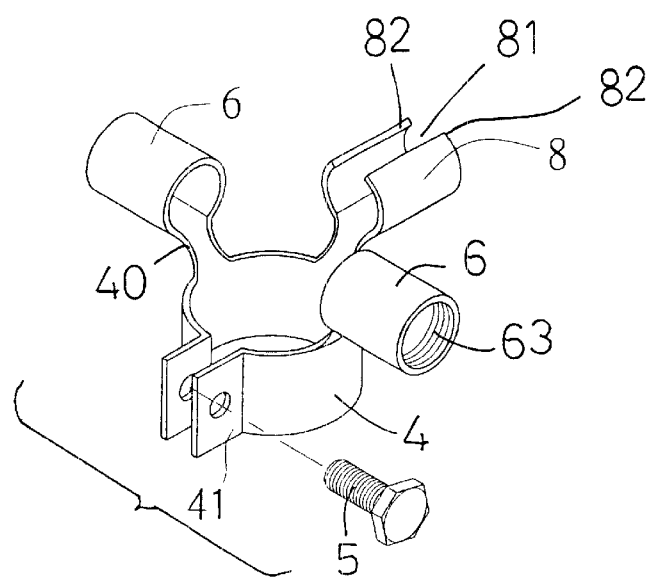
Figure 4:
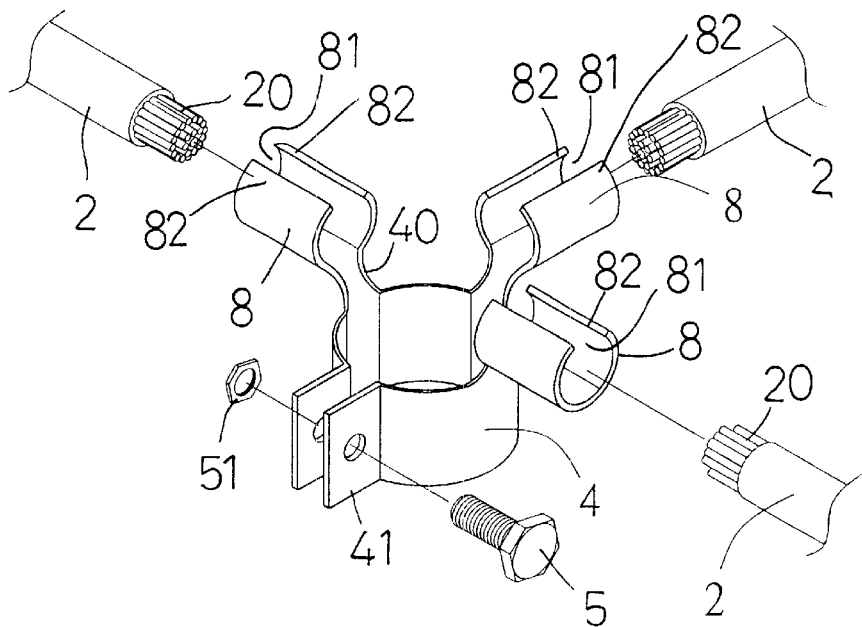
Figure 5:
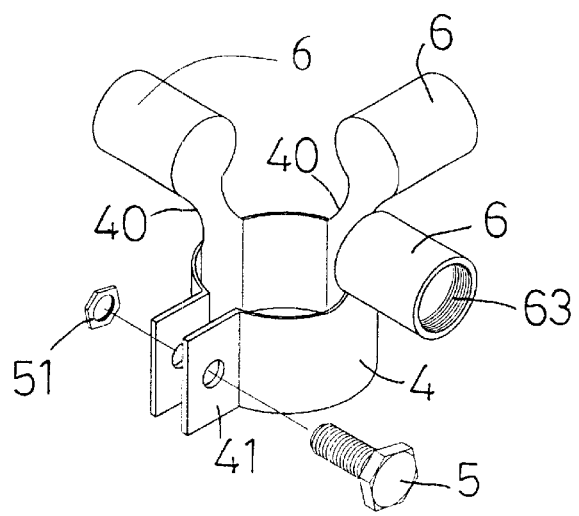
Figure 6:
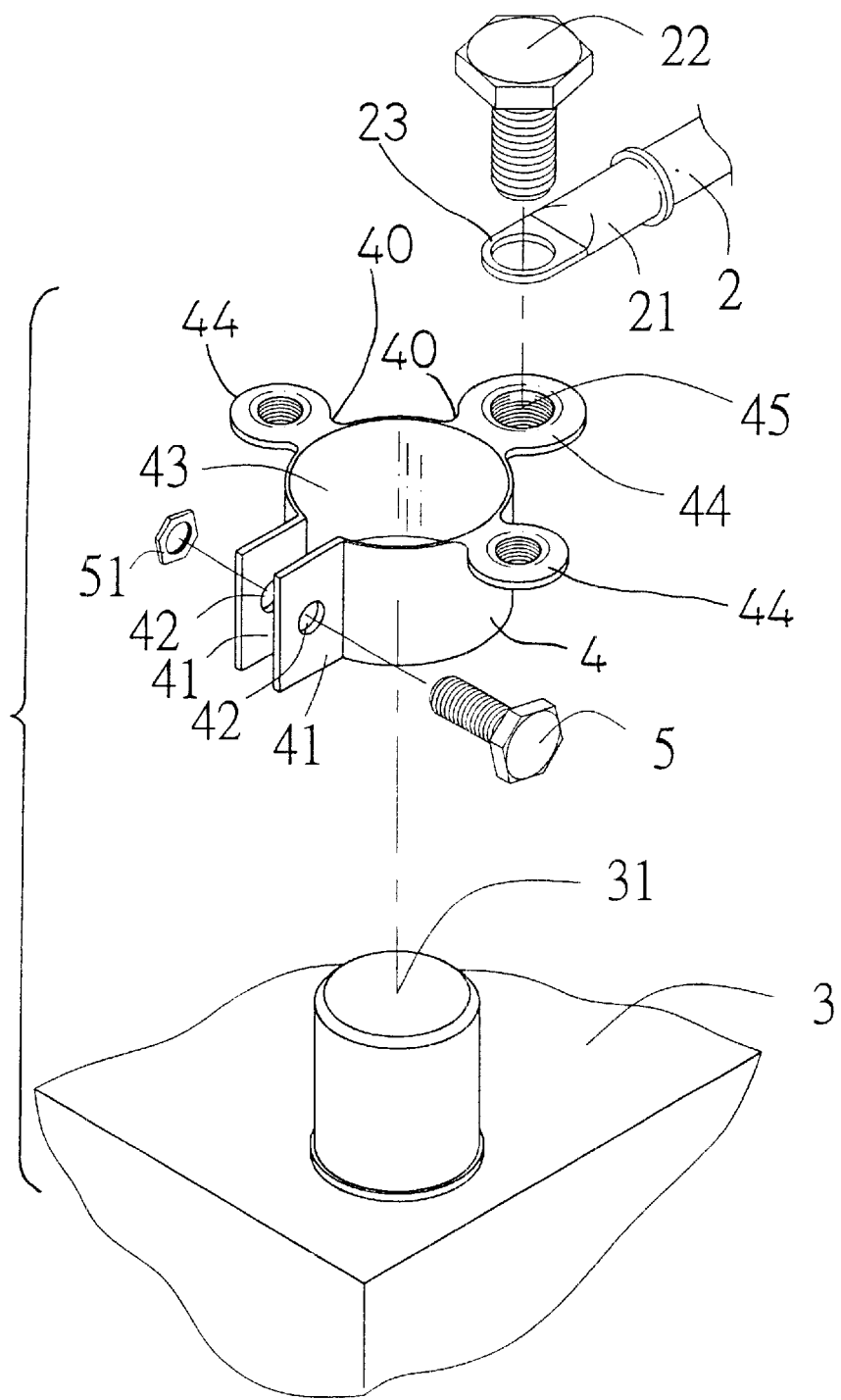
FIG. 6 is an exploded view illustrating a further embodiment of the cable attachment assembly.
Figure 7:
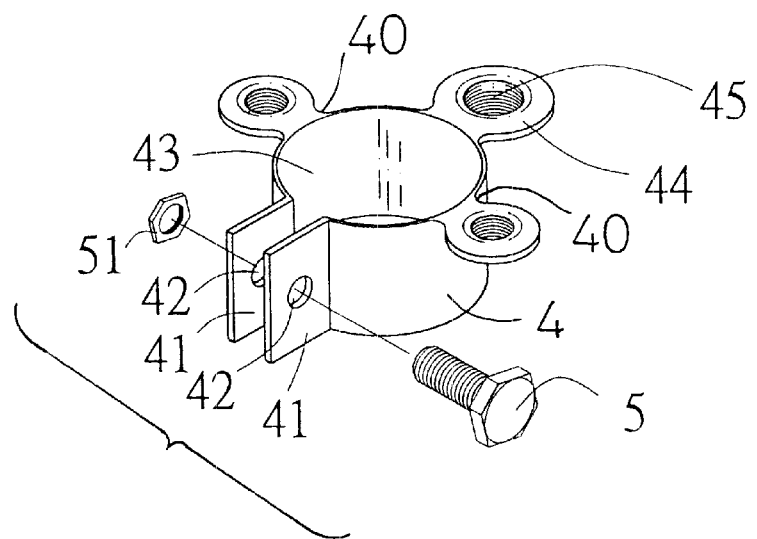
FIGS. 7 and 8 are partial exploded views illustrating the further embodiments of the cable attachment assembly.
Figure 8:
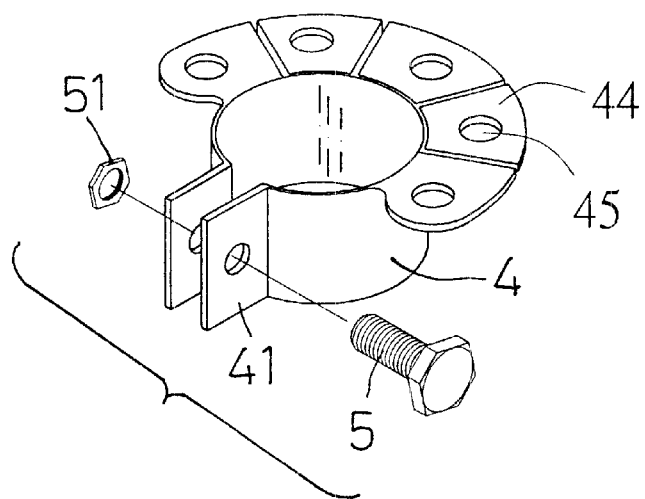

As shown in FIGS. 1, 3, 5, the tubes 6 each includes a screw hole or an inner thread 63 formed therein for threading with a fastener or a lock nut 62. A block 61 is preferably engaged into each of the tubes 6. The lock nut 62 includes a bore 621 formed therein. The cable 2 includes one or more electric wires 20 engaged therein and engaged through the bore 621 of the lock nut 62. The ends of the electric wires

20 are preferably bent relative to the cable 2 and engaged between the block 61 and the lock nut 62, for allowing the electrical wires 20 of the cable 2 to be easily and solidly secured and electrically coupled to the positive or the negative terminal post 31 of the batteries 3 of the vehicles with the tubes 6 and the lock nuts 62 of the clamping member 4. The cables 2 may thus easily and electrically couple the other or various electric facilities to the battery of the vehicle.

Accordingly, the cable attachment assembly in accordance with the present invention may be used for attaching onto the battery of the vehicle and for coupling to the other electric facilities.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cable attachment assembly for attaching onto a terminal post of a battery of a vehicle, said cable attachment assembly comprising:

a clamping member including an opening formed therein for receiving the terminal post of the battery and including two ends each having an ear extended therefrom, said ears each including an orifice formed therein, and a fastener engaged through said orifices of said ears for forcing and securing said ears together and for securing said clamping member onto the terminal post of the battery.

2. The cable attachment assembly according to claim 1, wherein said clamping member includes at least one flap extended therefrom.

3. The cable attachment assembly according to claim 2 further comprising a cable including a first end having a coupler attached thereto, and means for securing said first end of said cable to said at least one flap.

4. The cable attachment assembly according to claim 3, wherein said coupler includes a hole formed therein, said at least one flap includes a screw hole formed therein, and said securing means includes a fastener engaged through said hole of said coupler and threaded to said screw hole of said at least one flap.

5. The cable attachment assembly according to claim 1, wherein said clamping member includes at least one clamping barrel extended therefrom for electrically coupling to a cable.

6. The cable attachment assembly according to claim 5, wherein said at least one clamping barrel includes two edges and a slot formed between said edges thereof, for allowing said at least one clamping barrel to be clamped onto the cable.

7. The cable attachment assembly according to claim 1, wherein said clamping member includes at least one tube extended therefrom for electrically coupling to a cable.

8. The cable attachment assembly according to claim 7 further comprising means for securing the cable to said at least one tube.

9. The cable attachment assembly according to claim 8, wherein said securing means includes an inner thread formed in said at least one tube, a lock nut threaded to said inner thread of said at least one tube and having a bore formed there in for receiving the cable.

10. The cable attachment assembly according to claim 9 further comprising a block engaged in said at least one tube for engaging with the cable.

11. A cable attachment assembly for attaching onto a terminal post of a battery of a vehicle, said cable attachment assembly comprising:

a clamping member including an opening formed therein for receiving the terminal post of the battery, said clamping member including at least one flap extended therefrom for electrically coupling to a cable.

* * * * *